INVENTOR.
Harvey A. Klumb

Feb. 1, 1966 H. A. KLUMB 3,232,183
PRESSURE RESPONSIVE DEVICES, E.G., DIAPHRAGMS, CAPSULES
AND INSTRUMENTS USING SUCH CAPSULES AND DIAPHRAGMS
Filed April 3, 1963 5 Sheets-Sheet 4

INVENTOR.
Harvey A. Klumb

INVENTOR.
Harvey A. Klumb

United States Patent Office 3,232,183
Patented Feb. 1, 1966

3,232,183
PRESSURE RESPONSIVE DEVICES, e.g., DIA-
PHRAGMS, CAPSULES AND INSTRUMENTS
USING SUCH CAPSULES AND DIAPHRAGMS
Harvey A. Klumb, Pittsford, N.Y., assignor to Taylor
Instrument Companies, Rochester, N.Y., a corporation
of New York
Filed Apr. 3, 1963, Ser. No. 270,311
12 Claims. (Cl. 92—90)

This invention relates generally to pressure-responsive instruments having aneroid capsules for actuating various mechanisms, such as indicating, recording, controlling, and/or signalling apparatus, and particularly to barometers and altimeters for use in such apparatus.

Aneroid capsules, bellows and other such sealed evacuated, flexible-walled chambers have been long in wide use. Since a flexible wall of such a chamber is generally a relatively-thin, corrugated shell or plate of elastic material, and said wall separates an evacuated space in such chamber from the ambient pressure of the fluid medium surrounding the capsule, e.g., the earth's atmosphere, it is necessary to reinforce the flexible wall so that it will remain operative without being collapsed or deformed into inoperativeness or imperfect operativeness by the larger values of the range of ambient pressure to which the flexible wall is exposed.

The usual reinforcing means is a main spring, distinct from the flexible wall and relatively-stiff as compared to the flexible wall. However, I have devised a novel form of capsule in which the flexible wall is itself the spring, being capable of maintaining a desired shape and remaining operative at relatively-large differences between the pressures on the two sides of the wall. This desirable property is obtained through use of a diaphragm having a suitable form in the free state of the diaphragm, said form being such that if the diaphragm has one surface thereof uniformly loaded by fluid pressure, the maximum loading will not deform the diaphragm to the point of inoperativeness, or of impaired operativeness.

In the case of a barometer or an altimeter, in accordance with the invention, I provide a diaphragm concavo-convex in form in its free state such that when the convex side of the diaphragm is exposed to a fluid pressure one atmosphere larger than the pressure on the concave side, the diaphragm will simply flatten out, so to speak. In the prior art, a diaphragm used in this fashion typically maintains a corresponding flat state with the aid of a separate main spring strong enough to maintain the diaphragm in the flat state in the face of the unbalanced pressure on the diaphragm.

In brief, therefore, an aneroid capsule according to the invention is self-supporting (i.e., it needs no main spring to help it maintain the proper shape), in appearance greatly resembles prior art capsules, and has the apparent advantage of eliminating a part (the main spring) while retaining its function (serving itself as a spring to maintain capsule shape and balance out the pressure on the capsule). However, I find that elimination of the main spring is accompanied by quite remarkable improvements in economy of parts, ease of manufacture and overall operation of instruments utilizing my novel aneroid capsule.

It will therefore be clear that the main object of the present invention is to provide a novel improved form of aneroid capsule. Other, more specific objects of my invention will appear in the detailed description to follow, hereinbelow.

Figure 1:
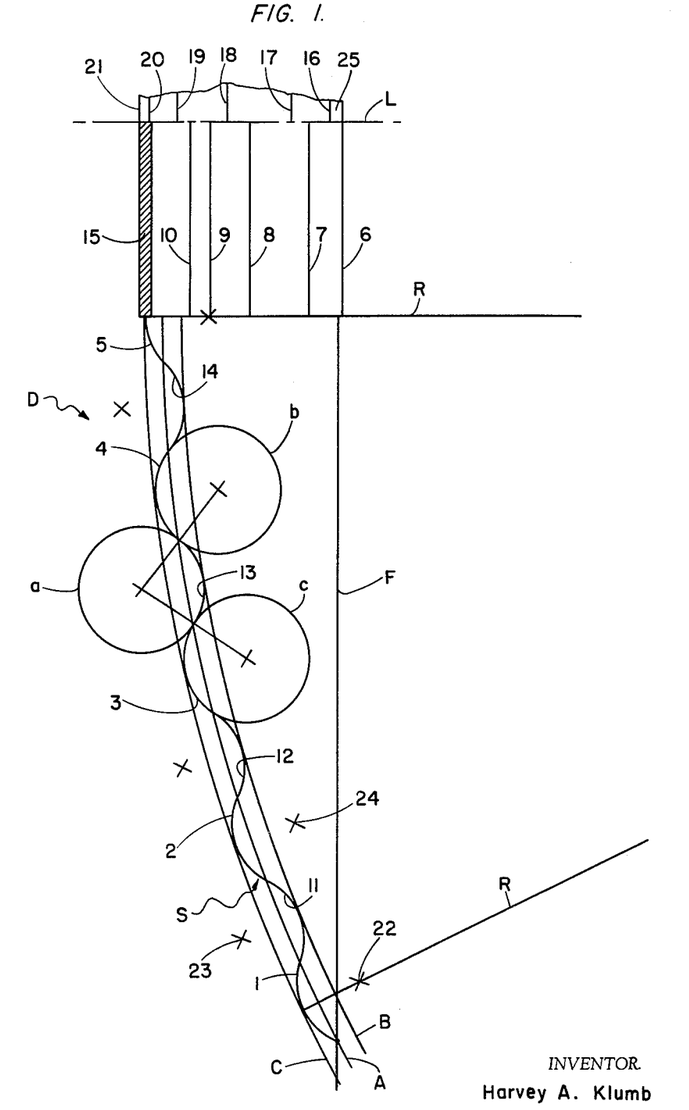
FIGURE 1 is a radial quasi-cross-section of a diaphragm according to the invention.

My novel diaphragm D is generally in the form of a concavo-convex shell having a circular periphery bounded by an annular flange or equivalent for rigidly clamping the diaphragm at its periphery with its periphery in a given plane. In FIGURE 1, the said plane is normal to the plane of the drawing surface and contains a rightline segment F. (A right line and a sinuous line are each deemed herein to be of indefinite extent, whereas a segment of each is a portion of the line of some definite length.) The said circular periphery is centered on a broken, right-line segment L perpendicular to segment F. The diaphragm has a plurality of annular corrugations centered on segment L, and a circular, rigid, central portion centered on segment L.

FIGURE 1 corresponds to a section of diaphragm D taken on any plane containing segment L. Since a full diametral section has mirror symmetry between the portion thereof to the right of segment L and the portion thereof to the left of segment L, only a half or radial cross-section is illustrated in FIGURE 1. Moreover, the radial cross-section is illustrated mainly as the line geometry of the diaphragm contour.

The geometrical part of the showing of diaphragm D, in FIGURE 1, comprises three circular equi-spaced arcs A, B and C, whose radii originate at the intersection, in the plane of the paper, of a pair of right line segments R. Accordingly, each right line containing a segment R also contains a radius of said arcs.

The basic cross-sectional contour of the diaphragm is the sinuous line-segment S bounded by arcs B and C. Segment S is a series of arcs of tangent circles, three of which are shown, denoted by reference characters $a$, $b$ and $c$, the points of tangency of the said series of arcs falling on the arc A where the latter intersects segment S. Arcs A, B and C, of course, do not correspond to structural elements of the diaphragm, but are rather formal aids useful in describing and/or generating the basic contour of the diaphragm.

Segment S is divided by arc A into the peaks and troughs forming the corrugations of the diaphragm, the peaks being denoted by reference numerals 1 through 5 and the troughs by reference numerals 11 through 14. Each corrugation, therefore, consists of a peak and the adjoining halves of the two next-adjacent troughs, or, looking at it from the bottom or concave side of the diaphragm, a corrugation consists of a trough and the adjoining halves of the two next adjacent peaks. Thus, peak 2 and the next-adjacent halves of troughs 11 and 12, make up one corrugation, or, trough 11 and the next-adjacent halves of peaks 1 and 2 make up one corrugation. For the purpose of the remainder of the disclosure, the convention used will be that a peak and the trough halves next adjoining that peak define a single corrugation. It will be observed that the outermost corrugation lacks a quarter part, since no trough half is adjacent the left side of peak 1, and that the innermost corrugation lacks a half part, for both half of peak 5 and a trough are lacking to the right of the intersection of the right-hand segment R with peak 5. Hence, there being, in addition, three full corrugations (corresponding to peaks 2, 3 and 4), there are 4¼ corrugations in all.

The material form of the radial cross-section of diaphragm D is represented between segment L and the upper segment R, which segments are mutually parallel. Here, reference numeral 15 denotes a radial section of the central pad portion or center pad of the diaphragm D, which central pad portion or center pad is to be supposed to be substantially rigid, circular, and having a finite, uniform thickness such as is illustrated by the cross-hatched section. In practice, it is usual, however, to reinforce pad portion 15 to assure substantially perfect rigidity.

Right line segments 6 to 10, inclusive, are drawn mutually parallel and so spaced that if extended to the left, segment 6 would run parallel to segment F at a spacing of half the vertical dimension, i.e., the thickness of pad 15. Line segments 7 to 10, inclusive, if extended to the left would miss being tangent to troughs 11 to 14, inclusive, by half the thickness of pad 15, passing below the respective troughs.

The showing to the right of segment L shows a fragment of the unsectioned diaphragm, segment 6 and the upper bound of pad 15 being extended to the right of segment L, in parallel with right line segments 16 to 20, inclusive. If line segments 17 to 20, inclusive, be extended to the left, they will be found to pass over, at a spacing of half the thickness of pad 15, the peaks 1 to 4, inclusive, in that order. Segment 16, if extended to the left, would parallel segment F at a spacing of half the thickness of pad 15. Sinuous segment S is therefore the bisector of the thickness of the corresponding portion of the actual diaphragm; segments 7, 8, 9 and 10 represent the parallel planes containing the vertical extremities of the circular ridges (looking at the concave side of diaphragm D) in the diaphragm corresponding to troughs 11, 12, 13 and 14, respectively; segments 17, 18, 19 and 20 represent the parallel planes containing the vertical extremities of the peaks 1, 2, 3 and 4; segment 6 represents the lower, planar surface of the diaphragm flange 25, which is fragmentarily represented by segment 16 and that portion of segment 6 to the right of segment L. Line segment 21 is an extension of the right line segment depicting the top surface of pad 15.

The foregoing arrangement of segments 6 to 10, inclusive, segments 16 to 21, inclusive, and the cross-section of pad 15, therefore imports into FIGURE 1 the fact that the cross-section represented by segment S has a vertical thickness. It hardly need be said that directly indicating the thickness aspect in FIGURE 1, to the left of the right-hand segment R, would create a complex of lines that would be so confused and tangled as to impede apprehension of the principle of the diaphragm contour.

It is to be observed that the concave-convex form illustrated in FIGURE 1 can be generated by use of compass and straight edge alone. For example, one may begin with segments R and arcs A, B, and C, segments R being chosen to be coextensive with the bisectors of the respective peaks they intersect, and to subtend an angle corresponding to a given number of corrugations of specified radius and depth (relative to arc A). The spacing of the arcs A, B and C determines the depth of the peaks and troughs, and the radii of the peaks and troughs determines their arcuate extent.

With the foregoing information having been determined, the peak radius is laid off on either the right-hand segment R or the left-hand segment R, say the former, and an arc drawn between arcs A and C, to establish peak 1. Conveniently, this also may be used to establish the plane of the diaphragm flange, for segment F may be drawn from the left-hand point of intersection of arc A and peak 1 to right-hand segment R, perpendicularly to this last.

The right-hand intersection of peak 1 and arc A, and the center of peak 1, determine the location of the center of trough 11, since said center must fall on a right line segment that lies two radii of peak 1 from the center of peak 1, the center of peak 1 being indicated by a cross 22, whereby the center of trough 11 falls at the point indicated by a cross 23. The trough 11 may now be drawn, using the radius of peak 1, of course. The center of peak 2, indicated by a cross 24, is then located in the same manner as the center of trough 11, and peak 2 drawn, using the radius of peak 1. The described construction process is exemplified more particularly in the case of peaks 3 and 4, and trough 11, wherein the said peaks and trough are the arcs of tangent, equal circles $a$, $b$, and $c$. All the peak and trough centers are indicated by crosses like those at 22, 23 and 24.

The basis of the process actually reduces to having given the arc A and one circle intersected by the arc to define a peak or trough, for the next circle's radius is determined by that of the former, and its location is determined by that radius and by one intersection of the said former circle on arc A and the center of said former circle. The more particular procedure previously outlined, however, is more orderly and convenient for certain factors may be given to begin with, such as corrugation depth, number and extent, and so on. It will be noted that the horizontal bisector of the thickness at pad portion 15 is tangent to both the half-peak 5 and arc A at the intersection of the latter with the right-hand segment R. Hence, if the view of FIGURE 1 be extended to show the entire diameter of diaphragm D, i.e., reproducing the counterparts of arcs A, B and C, of segments R, and so on, to the right of center line L, the center of the counterparts of arcs A, B and C will be spaced by the diameter of pad portion 15 (i.e., twice the lengthwise extent of the hatched part of portion 15) along the horizontal (i.e., along the right line that includes segment F). The right-hand radial half of the diaphragm D could be formed on a continuation of arcs A, B and C, the extent of pad portion 15, and I consider designing the diametral contour on a single set of arcs A, B and C to be within the scope of the invention.

From a practical point of view, the diaphragm D of FIGURE 1 is characterized basically by the fact that the radial cross-section of its corrugated portion is a series of arcs of tangent equal-radius circles; wherein the arcs are joined end to end with alternating sense of curvature, the circular arcs B and C form the envelope of the said series of arcs, i.e., arc B is tangent to each of the arcs of one sense of curvature; likewise, the circular arc C is tangent to each of the arcs of the opposite sense of curvature.

In the design of diaphragms, it often happens that a theoretical diaphragm requires considerable modification before a real diaphragm according to the design tests out as desired. In the present case, however, the basic design, as described in the preceding paragraph requires no modification in practice. Thus, while in going from theory to practice, some trial must be made of variables such as number of corrugations, depth of corrugations and the radius of curvature of arc A, the final diaphragm form is very closely that of equal tangent circular arcs having concentric circular envelopes.

Figures 2, 3:
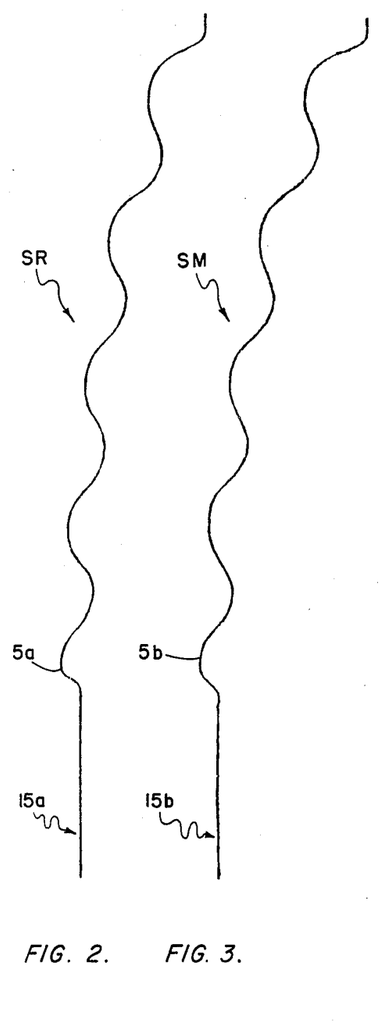
FIGURES 2 and 2A are photolithographic reproductions of tracings of part of the surface of a diaphragm according to the invention.
FIGURES 3 and 3A are also photolithographic reproduction of tracings of part of the surface of a second diaphragm according to the invention.

This result is reflected in FIGURES 2 and 3 which are lithographic reproductions of radial tracings of the convex surfaces of actual diaphragms having the desired performance, the diaphragm corresponding to the tracing SR, FIGURE 2, having been produced by a rubber-backed die, and the diaphragm corresponding to the tracing SM, FIGURE 3, having been produced by a metal-backed die.

In the former case, a concave metal die having a face contour designed after the manner of FIGURE 1 has a sheet of diaphragm material deformed to the die contour by compressing the sheet between the die face and a rubber blanket.

In the latter case, a concave metal die and a convex mating metal die, each having a face contoured after the manner of FIGURE 1, compress the said material, which may be either in flat form, or in "preformed" condition, i.e., partly deformed to the desired contour by means of a so-called "preform" die.

In each case, the metal die elements were cut to the theoretical contour and trimmed until the diaphragms made thereby met dimensional requirements of said contour. Examination of traces SR and SM show a few irregularities (e.g., flats), which may be due to such trimming, but not necessarily.

Nevertheless, if trial be made with a compass, the peaks and troughs of the tracing SR and SM will be found to be very nearly circular and tangent to each other. Moreover, in each case it will be found that pairs of circular arcs like arcs B and C, FIGURE 1; very nearly envelop the peaks and troughs. The diaphragm corresponding to tracing SR has slightly better performance than that corresponding to tracing SM, and, also more nearly conforms to the theoretical shape than does the latter. As is well known, a stamping from a rubber-backed die generally conforms more precisely to the die contour than does a stamping from a metal-backed die. Nevertheless, the closeness with which the real contour approaches the ideal contour, in each case, is such that deviation of the real from the ideal would be hardly perceptible, if the contours were illustrated life-size (about ⅙ of the dimensions adopted in rendering FIGURE 1, and about ⅐ of the dimensions of the tracings reproduced in FIGURES 2 and 3).

Figure 4:
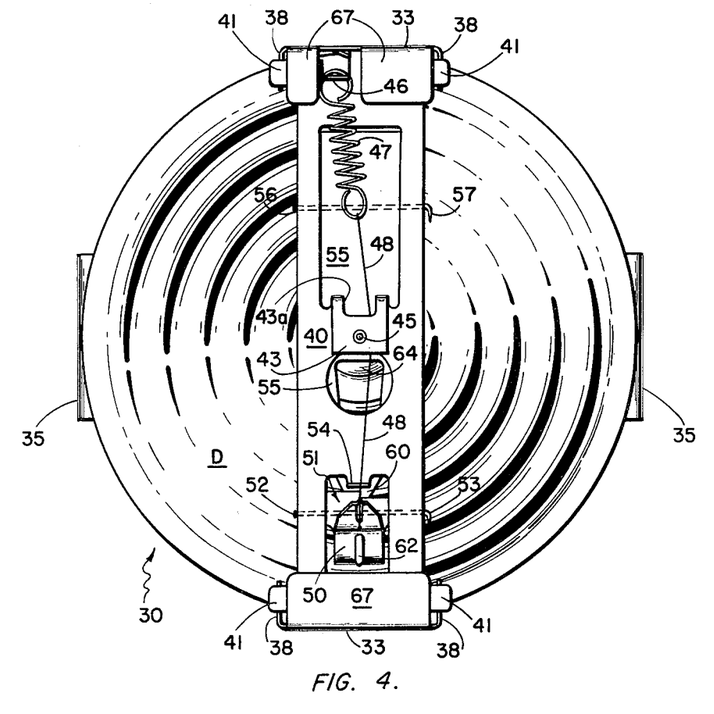
FIGURES 4, 5 and 6 are respectively a plan view and two elevations of an instrument movement incorporating a novel aneroid capsule according to the invention.
Figure 5:
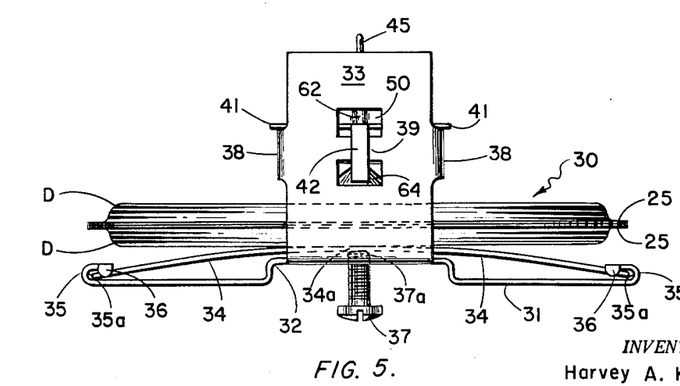
Figure 6:
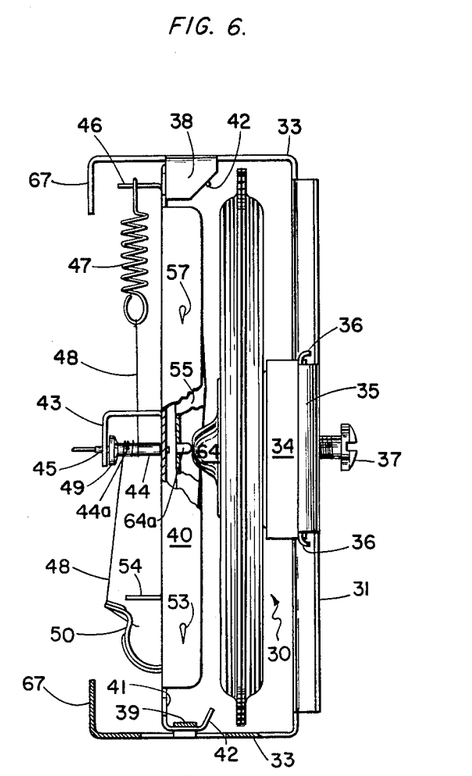

My particular use of the novel diaphragm is to construct a two-diaphragm capsule, such as is illustrated in FIGURES 4, 5 and 6. Briefly, a couple of diaphragms D are clamped flange to flange, concave side to concave side, and are then welded or otherwise sealed continuously around the flanges thereof. Following this, the resultant capsule is heat-treated to develop the desired elastic characteristics in the material of the diaphragms, evacuated (a minute trace of air or other gas is left to provide temperature compensation, in accordance with usual practice), and sealed. The evacuated capsule, when exposed to approximately one atmosphere of external pressure, collapses to a flat state wherein the troughs of the two diaphragms very nearly touch. Preferably, the exact pressure at this point should be equal to or slightly less than the higher limit of the expected range of pressure variation to which the capsule is to be exposed.

The capsule material is preferably one that is sufficiently ductile for good die forming results, but which when heat-treated develops the spring-like characteristics needed by the capsule walls to be self-supporting and to deflect as a continuous function of pressure. I have found the so-called "720" alloy material (60% copper, 20% nickel, 20% manganese) highly suitable. Beryllium copper may also be used, in which case, since its modulus of elasticity after heat treatment is a little less than that developed by heat treatment in 720 alloy, a correspondingly greater thickness of material would be required. The 720 alloy used is in the form of rolls of sheet stock, which may range from 0.0045" to 0.0048" in thickness, with an allowable variation of 0.0002" from any value in the normal range in any given lot of otherwise uniform diaphragm material. Obviously, any die-formable material, capable of developing the necessary spring-like character in response to treatment not altering the desired diaphragm contour, could be used.

In some actual diaphragms, the pad portions 15 may take the form of a more or less conical rigid member, such as is shown at 64, or of a central portion of a spring 34; see FIGURES 4, 5 and 6. It will be observed from the tracings SR and SM in FIGURES 2 and 3, that the pad portions of the diaphragms are recessed as at 15a and 15b so that the inmost corrugation peak breaks off, as at 5a and 5b, on a relatively-small radius. The members 64 are shaped to fit the recesses 15a and 15b, and are soldered therein or otherwise rigidly affixed to the surfaces of the pad portions. Conveniently, an analogous practice is followed by providing a boss in spring 34 that interfits the central recess in the diaphragm and is fixed therein. Normally, center holes will be found in the diaphragms to provide for evacuation, the said members 64 and the said bosses sealing off these holes (the soldering is done as part of the heat treating and evacuating process). In practice, the small radii at 5a and 5b are so stiff that it is unnecessary that the said bosses and members 64 fit closely enough in the recesses to give the effect of a rigid pad portion 15 terminating abruptly at the half-peak point of the innermost corrugation. (Nevertheless, said bosses and members 64 assure practically perfect rigidity of the pad portion as a whole.) End effects at the junction of the diaphragm flanges and at the small radius at 5a and 5b are substantially non-existent for most of the corrugation-bending in response to pressure occurs in the corrugations between the innermost and outermost corrugations. In fact, each of these latter contribute much less to the diaphragm deflection than does any one of the intermediate corrugations.

In actual practice, the diaphragm D, when assembled into a capsule, may not flatten out quite enough when exposed to atmospheric pressure at sea level. In other words, speaking ideally, the envelope of the sinuous segment S should reduce to a pair of parallel straight lines, i.e., the corrugations would be contained exactly between a pair of parallel planes, one tangent to the troughs and the other tangent to the peaks. In the flattest practical state, however, the peaks of the intermediate corrugations are tangent to a common plane substantially parallel to the plane of the diaphragm flange, and the said common plane is slightly above the peak of the outermost corrugations and slightly below the peak of the innermost corrugation. As a practical matter, when the flanges of the diaphragms are in direct contact with each other, it would not be desirable, in any event, for the capsule to collapse so far as to cause the diaphragms to contact each other in the pressure range of use.

Figure 2A:
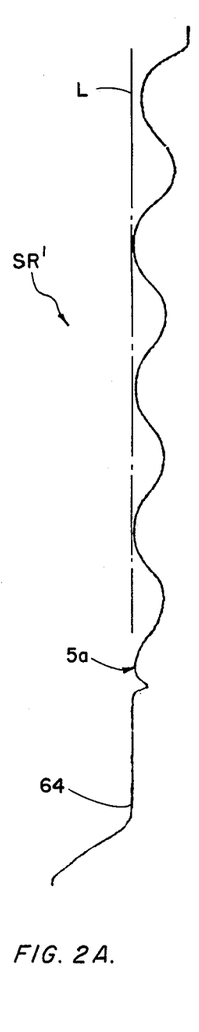
Figure 3A:
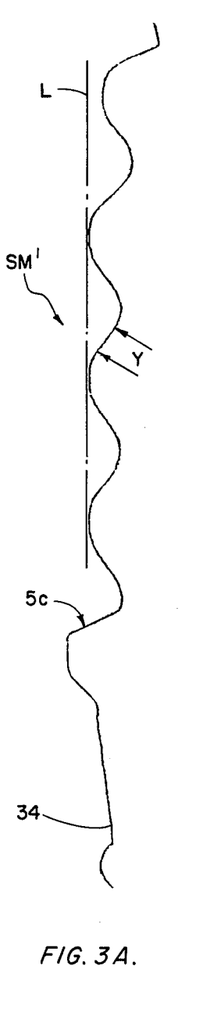

FIGURES 2A and 3A are illustrative of the evacuated capsules that would result if the diaphragms traced for FIGURES 2 and 3 were assembled into such capsules in accordance with the foregoing considerations and treatment. In other words, FIGURES 2A and 3A correspond respectively to FIGURES 2 and 3, in that in FIGURE 2A, the sinuous segment SR' is in effect the segment SR of FIGURE 2 flattened out. Likewise, in FIGURE 3A, the sinuous segment SM' is in effect the segment SM of FIGURE 3 flattened out. Actually, FIGURE 2A is a tracing of the outer surface of an evacuated capsule composed of two diaphragms D formed by the same rubber-backed die that was used to form the diaphragm D whose tracing is shown in FIGURE 2. FIGURE 3A stands in the same relation to FIGURE 3, i.e., the diaphragms involved here were made by the same metal-to-metal dies.

Inspection of FIGURES 2a and 3a will show that the three intermediate peaks are very nearly tangent to the same straight line, represented by a broken line segment L, and in each case, the line segments L being drawn parallel to the plane of the diaphragm flanges. However, it will be evident that the outermost peak is closer to segment L in the diaphragm corresponding to SR' than in that corresponding to SM'. It will be seen that the latter diaphragm is not quite as close to the flat state as the former but would approach it more closely at a slightly higher barometric pressure (not necessarily, however, bringing its outermost peak as close to segment L as the corresponding peak of SR' is shown to be in FIGURE 2a).

The tracings of FIGURES 2a and 3a show the contours, respectively, of the member 64, and of the spring 34. In the former case, it will be noted that member 64 does not completely fill the depression at 15a, hence, the peak 5a shows up in the tracing SR'. In tracing SM', FIGURE 3a, the spring member 34 has interfered with the stylus of the tracing apparatus to produce a straight segment 5c, due to the fact that at just about the point the stylus begins to rise on the contour of the innermost peak, the edge of spring 34 struck the stylus, which then lifted off the surface of the diaphragm and caused the straight segment 5c to be recorded. Except for this, the peak 5b would have been indicated to be above segment L and just slightly higher than the next adjacent peak.

The originals of FIGURES 2, 2A, 3 and 3A were made by automatic tracing apparatus having a stylus-like element constrained to a rectilinear motion along the vertical, and including detecting means to detect contact of said element, or near contact of said element, with an object at a point on said object falling on the vertical line of motion of the stylus-like element. Servo-motor means responsive to said detecting means automatically maintained said stylus-like element at substantially zero-spacing from said object and simultaneously provided an output signal of amplitude corresponding to the distance of said stylus-like element from a predetermined point on said line of motion, said output signal being at a sufficiently-high energy level to operate a suitable recording device having a pen or other marker moving vertically in accordance with the amplitude of said signal, and a strip chart moving horizontally past, at uniform velocity with respect to, and in contact with, the point of said pen, thus creating a trace on said chart of the contour of said object, but at a substantial magnification, as the said object was moved so that the line of motion of said stylus-like element cut the body of said object.

In the case of the capsules and diaphragms represented by the tracings, these were moved in a straight line with their flanges in a plane normal to the line of motion of said stylus-like element, and with their center lines moving in a plane containing the line of motion of said stylus-like element. Hence, each of the illustrated tracings correspond to approximately half a diametral section taken from flange to center-pad portion of a diaphragm.

The diaphragms corresponding to the tracings of FIGURES 2 and 3 were traced in their free state, i.e., unstressed by pressure differences across them, or other influences that might deform them.

The capsule corresponding to FIGURES 2A and 3A were, however, subject to the effect of ambient pressure which, in this instance, was just slightly less than a standard atmosphere at sea level, which latter is the nominal higher limit of operation for usual purposes; barometers, altimeters, etc. For all practical purposes, FIGURES 2A and 3A represent precisely the approach to the flat state that would be expected of the diaphragms corresponding to FIGURES 2 and 3, were they to be assembled into evacuated capsules.

It will be noted that tracing lines are not of uniform density and width, hence, the actual point to point smoothness of the diaphragm surfaces is thereby obscured. However, interval-wise (as in the approximate interval Y indicated in FIGURE 3A), flats, deviations from circularity, etc., can be detected to a fineness of less than the average width of the tracing in any interval thereof. It is also to be remarked that the reaction of the stylus-like tracing element on the diaphragms and capsules and its spacing from their surfaces was zero, insofar as present purposes are concerned. In any event, an expert by inspection of FIGURES 2 and 3 can detect the fact that these are tracings of different diaphragms. Moreover, he can also detect the fact that the diaphragms corresponding to FIGURES 2 and 2A are similar where these each differ from FIGURES 3 and 3A, simultaneously. Again, if he is familiar with contours of the dies used, he can tell, without comparing tracings of diaphragms or capsules together, which die was used in a given case.

In other words, the tracings SR, SM, SR' and SM', as illustrated, accurately portray deviations from ideal diaphragm contours.

In the foregoing, the concern here has been with my novel diaphragm as used in a double-diaphragm capsule, wherein the diaphragm flanges are in direct contact with each other, or very nearly so, an arrangement which inherently limits diaphragm deflections from concavo-convex to flat. However, such limitation is not a property of the diaphragm as such, for there are some prior art capsule forms and diaphragm mountings that permit the diaphragm or diaphragms to deflect in both directions from a flat state, e.g., one may imagine deflecting diaphragm D so that segment S is deformed to a position where at least part of it is below segment F. The novel diaphragm would be well adapted for use in the corresponding pressure range for its pressure "constant" is most favorable i.e., small and decreasing continuously as it goes from the state indicated in FIGURES 1, 2 and 3 to flat states, such as shown in FIGURES 2A and 3A.

One of the chief virtues of my novel capsule is its reproducibility to the extent that it is unnecessary to calibrate or test the functioning of the capsule before installing it in a movement. Once it is ascertained that the die produces diaphragms having the cross-section indicated by FIGURE 1, such diaphragms may be assembled into capsules, which in turn may be assembled into movements without further ado. Simple inspections and dimensional checks, to catch malformations, leaking capsules, and the like, suffice for quality control purposes.

This pre-supposes that the diaphragm material meets its specifications sufficiently closely; that the dies are correctly positioned in the press, or that if the die set-up has been dissambled that it is restored to the correct position, that the forming pressure schedule of the die-works is correct, and that the proper procedures are followed in capsule assembling, sealing, evacuating and heat treating. This scheme of things, or equivalent, obtains, however, in any metal-fabricating process, and it will be observed that the only real testing involved in it is checking the material specifications for composition, dimensions, and in this case, proper annealing in the process of fabricating the sheet material.

As a result, thousands of diaphragms may be produced, processed into capsules and assembled into instrument movements with no concern whatsoever as to product quality other than to assure that the axial depths of the diaphragms are to specifications, and that the capsules do not leak.

The performance of a diaphragm, capsule, or equivalent pressure responsive device is judged, first, on the available energy therefrom. The work done by a pressure change on the capsule is proportional to the volume swept out by the flexible wall or walls of the device. The useful work, i.e., the "available energy" for operating the mechanism of a movement, or other ultimate load, is a small fraction of the total energy into which the said pressure change is converted. Available energy in practice is given by the expression $$E = (\overline{P})^2 \frac{Ae}{2C_p}$$

wherein $\overline{P}$ = change of ambient pressure on flexible wall or walls;
$Ae$ = effective area of wall or walls;
$C_p$ = pressure constant, ratio of $\overline{P}$ to the deflection it causes (not really "constant," but conventionally called so nevertheless).

From Equation 1 it is evident that $Ae$ large and $C_p$ small are desirable traits for a diaphragm insofar as available energy is concerned. The size of $C_p$ is particularly important, for considerations of overall bulk dictate some limitation on the magnitude A*e*. Moreover, it is desirable that the variabiltiy of C_p be not too great over the range of pressure change of intersect.

The foregoing considerations may be applied to compare instruments using aneroid capsules and in the table below, barometer movements W, X, Y and Z are compared thus and on other considerations, as well.

| Movement | $C_p$ | A$e$ | $E/(\overline{P})^2$ | Cost | Calibrated? | Linearity | Size |
|---|---|---|---|---|---|---|---|
| W | 75 | 3.0 | 0.0200 | Highest | Yes | Good | Large. |
| X | 100 | 2.7 | 0.0135 | Intermediate | Yes | Good | Large. |
| Y | 160 | 0.7 | 0.0022 | Low | Yes | Acceptable | Compact. |
| Z | 50 | 2.0 | 0.0200 | Least | No | Good | Compact. |

All numerical values in the table are expressed in the pound/inch system, so that $E/(\overline{P})^2$ comes out in inch-pounds per (pounds per square inch)$^2$. Also, a movement here is considered to consist of essentially a capsule and a motion-amplifying mechanism which transforms expansions and contractions of the capsule into a motion of such magnitude as to be suitable for driving a pointer over a scale. The energy E was measured, for $\overline{P}=1$ p.s.i., at the point where the expansions and contractions of the capsule are transferred to the motion-amplifying mechanism, with the capsule being loaded by the motion-amplifying mechanism at that time.

Movement W is the finest product of the instrument maker's art, and movement X is not as far off from this as the entry Intermediate might suggest, either in cost or performance. Each has a relatively large capsule, and in addition, a main spring, hence, is relatively bulky. As the table indicates, each is greatly superior, performance-wise, to movement Y.

Movement Y is designed for mass production and marketing, for mass taste and price appeal, and is relatively compact and modest in performance. Its capsule is quite small to insure compactness and requires the usual, space-consuming and friction-generating main spring.

In addition to the main spring, movements W, X and Y have in common a need for calibration. That is, each instrument using these movements must be exposed to a series of known pressures and adjusted so as to minimize indication errors. This need is mainly due to variability of the response of capsule and main spring sub-assembly to pressure.

Besides being a barometer movement, movement Z has little in common with movements W, X and Y, as a group, other than to require zero-setting for the altitude of use, which in the case of any barometer, is up to the user and obviously cannot readily be taken care of by the manufacturer.

On the other hand, movement Z surpasses each of movements W, X and Y in some characteristic in which one would suppose the latter should be outstanding. As to movement W, movement Z gets the same energy as the former, but out of a capsule of ⅔ the effective area, and, hence, much less the bulk of the capsule of movement W, and is even better in this respect in comparison to movement X.

As to movement Y, its chief virtue is perhaps cost, yet movement Z actually costs about ⅘ as much to produce, as does the former, and at the same time provides greatly superior performance, and is as compact. The non-linearity of capsule and spring of the Y movement is such that in reality two different versions are required, one for a use-altitude of 0 to 3500 ft., and the other for a use-altitude of 3,500 to 7,000 ft. A single movement Z, on the other hand, more than covers both these ranges of use-altitude, e.g., 0 to 10,000 ft. on an instrument using this movement.

Movement Z, of course, is one using my novel capsule. Since it has no main spring, that proportion of its bulk used to accommodate a capsule may be larger than would be the case with its fellows, or the space saving represented by eliminating the main spring may be used to diminish the overall bulk of the movement.

Furthermore, movement Z needs no calibration, provided the motion-amplifying mechanism which, with the capsule, makes up the movement, does not itself need adjustment of some sort. Further on, infra, I will describe an example of a motion-amplifying mechanism that is at the same time, simple, inexpensive, precise and also not requiring calibration.

Movements W, X and Y represent the gamut of barometers and like instruments in use now for many years, being more or less traditional, commercially-successful designs which have not been modified greatly in many decades. Movement Z, on the other hand, represents a radical departure from its fellows, in that elimination of the main spring in a practical movement is a drastic modification of a basic design, namely, aneroid capsule, main spring, and motion-amplifying mechanism, which design is as old as the aneroid barometer itself.

The improvement in barometer movements, represented by movement Z is essentially due to use of my novel capsule therein. Because of the free-state shape of the diaphragms used in my novel capsule, the capsule needs no main spring in its loaded state. By virtue of the free-state shape of the diaphragm and because of the main spring, my novel capsule is more sensitive (i.e., has a low pressure constant $C_p$), more linear, higher in available energy, more uniformly reproducible, and more economical of space and material, than its prior art counterparts. While some or even all these advantages may in some sense be due to eliminating the main spring, it is not possible to positively state what is due to such elimination and what (beyond eliminating the need for such spring) is due to capsule shape. Nevertheless, I have determined by actual trial that substantial departures of circularity of corrugation peaks and troughs, or of the envelopes of these peaks and troughs lead to performance defects such as oil-canning, excessive deviation from linearity, failure of the capsule walls to flatten out sufficiently insufficient sensitivity to pressure change, and so on. Disparity among the radii of peaks and troughs and change in number of corrugations will also adversely affect the performance of a successful basic design. In treating the diaphragms, it is important not to subject them to cleaning procedures or materials that will etch or otherwise modify the diaphragm surfaces, for such is likely to change capsule performance in an unpredictable fashion.

The foregoing reflects the fact that design and manufacture of diaphragms and the like, is an art rather than a science. Nevertheless, I believe that the illustrated diaphragm contour shown in FIGURE 1 is the source of the desirable characteristics of my novel capsule. Those skilled in the art, given the concept of the diaphragm contour of the sort indicated by FIGURE 1, would routinely be able to take that concept and design a diaphragm that, while it might differ dimensionally, in number of corrugations, and so on, from that which I have disclosed herein, would have the advantageous behavior I contemplate, supra, when assembled into an aneroid capsule, or analogous pressure responsive unit.

FIGURES 4, 5 and 6 illustrate an example of movement Z, supra. Here, a capsule 30, composed of two diaphragms D, welded together concave side to concave side by their flanges 25, is mounted on a generally circular support plate 31, provided with a diametral stiffening channel 32, the web of which terminates at each end in a wing 33 projecting from the edge of the plate 31 and perpendicular thereto. A generally rectangular spring leaf 34, of about the diameter of plate 31, and flat when in unstressed position, is sprung between a pair of wings 35 projecting from the ends of a diameter of plate 31 but bent over to form a pair of troughs 35a opening toward each other. Each of wings 35 is provided with tabs 36 bent down over the ends of the said troughs toward plate 31 but preferably not so close thereto that ends of spring leaf 34 cannot be forced closely enough to plate 31 that they cannot slide out of the said troughs passing under the tabs 36.

The center portion of spring leaf 34 is integrally secured to the bottom diaphragm D of capsule 30 at substantially precisely the boundary of the pad portion thereof corresponding to recess 15a in FIGURE 2. Spring leaf 34 (its ends are preferably rounded to permit easy insertion under wings 35) is bowed upwards by channel 32, when leaf 34 is fitted between wings 35, with its ends under the wings 35. Since the tabs 36 prevent said ends from sliding out from under wings 35, said spring leaf is held securely in the position shown by reason of its springy nature.

A set screw 37, threaded into a central aperture (not shown) in plate 31 is provided that can be screwed along the axis of symmetry of capsule 30 (which axis coincides with center line of plate 31) to force the central portion of spring leaf 34 further away from plate 31, thus elevating the capsule 30 above the plate. Wings 35 extend inwardly far enough that an end of said spring leaf cannot slip out of troughs 35a as the leaf is forced upwards. The end 37a (shown in dashed line in FIGURE 5) of screw 37 abuts against the under side of the intermediate portion 34a (shown in dashed line in FIGURE 5) of spring leaf 34 facing plate 31. Intermediate portion 34a is rigidly fixed to the central portion of the lower diaphragm D to define a circular, rigid center pad corresponding to pad 15, FIGURE 1.

The center pad portion of the diaphragm D next the plate 31 is therefore held firmly at a fixed distance from the plate, since it is rigidly prevented from moving in one direction by screw 37, and, in the other direction by the relatively-stiff elastic force opposing further bowing of spring leaf 34.

The motion amplifying mechanism of the movement is supported by and between wings 33, these latter each being provided with arms 38 projecting inwardly of and generally parallel to plate 31, and each thereof having a hasp 39 projecting out of the general plane thereof toward the center line of plate 31. Only the one hasp 39 is shown, the other thereof being located between ears 38 at the right-hand side of FIGURE 6.

A generally channel-shaped bridge 40 rests on the support provided by hasps 39 and arms 38, a pair of ears 41 projecting from the web of the bridge 40 at each end thereof over and resting on a pair of arms 38, and a tongue 42, projecting from each end of bridge 40, being hooked through a hasp 39. Bridge 40 and wings 33 should be made to interfit tightly without play, as by bending up the extremities of the tongues 42 around the hasps and flattening the hasps slightly, and/or spreading wings 33 so that tongues and hasps tightly engage each other.

A stirrup 43 projects up out of the web of bridge 40 and over the central portion thereof so that the center line of plate 30 passes through the horizontal extremity of stirrup 43. Between this extremity and the web of bridge 40 is a cylindrical arbor 44 having a reduced cylindrical portion 45 received in a circular aperture in said extremity of said stirrup and extending far enough therefrom to provide for mounting a pointer thereon. The other end of arbor 44 terminates in a reduced cylindrical portion (not shown) received in a circular aperture (not shown) in the web of bridge 40, the cylindrical axis of said arbor, of its reduced portion, and the centers of said apertures coinciding with the center line of plate 31, conveniently.

Figure 8:
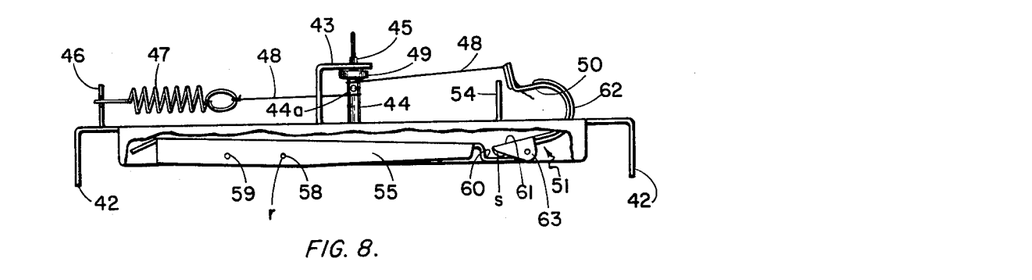
Figure 9:
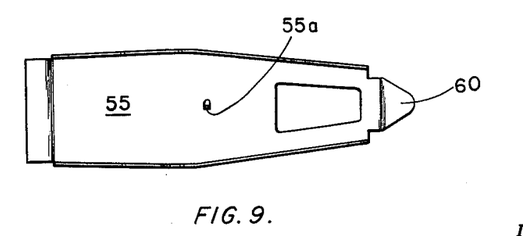
FIGURE 9 is a plan view of a lever used in the structure shown in FIGURES 4 to 8, inclusive.

A post 46 projects upwardly from the surface of bridge 40 at one end thereof, and on this post is hooked one end of a light extension spring 47, and to the other end of spring 47 is tied one end of a flexible inextensible cord 48, said cord being coiled several times about arbor 44 (which has fixed thereon a beveled disk 49 which prevents cord 48 from climbing up off the body of arbor 44) and having its other end fastened to one end of one arm 50 of a crank 51 (see FIGURE 8). Cord 48 passes through a cut out 43a in the vertical portion of stirrup 43, and a hole 44a is provided in arbor 44 in order to assure a nonslipping connection between arbor 44 and cord 48. Crank 51 is journaled on a straight pin which, as indicated by the dashed line showing of the body thereof, passes through the sides of bridge 40, and whose head 52 and bent point 53 prevent it from slipping out of the sides of bridge 40. If crank 51 is deflected so as to uncoil some of its portion of cord 48 from arbor 44, said arbor rotates, wraps up some cord from the portion thereof tied to spring 47 and extends spring 47. If the deflecting force is removed from crank 51, the spring 47 will pull the crank back to the position from which it was first deflected. Spring 47 is therefore a return spring that takes up play in the motion amplifying mechanism and unwraps its portion of cord 48 from arbor 44 to the extent permitted by the motion amplifying mechanism and the forces, if any, acting in opposition to the spring's tendency to assume its free length or contracted state. A post 54 upstanding from bridge 40, is positioned in the path of and closely enough to arm 50 to prevent complete return of the spring 47 to its free length.

Figure 7:
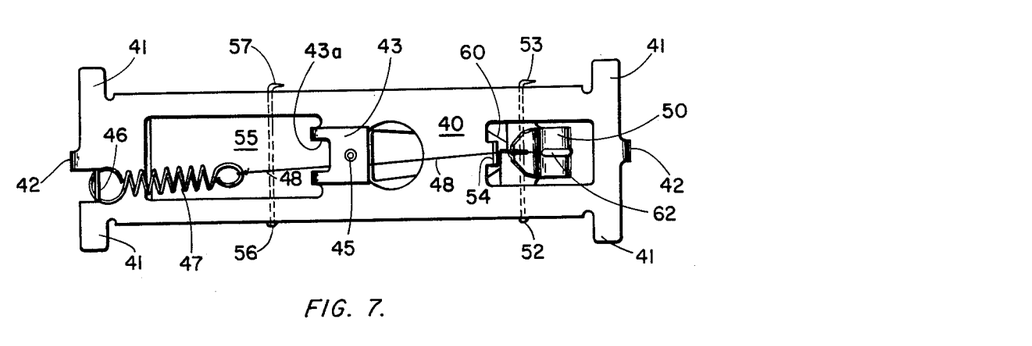
FIGURES 7 and 8 are, respectively, a plan view and an elevation of a motion amplifying mechanism similar to that shown in FIGURES 4, 5 and 6.

It will be observed, in FIGURE 4, that the two halves of cord 48 come off arbor 44 at an angle substantially less than a straight angle. This arrangement is adopted in the case where the movement is used in an altimeter. In FIGURE 7, which shows end portions of bridge 40 from the top more fully, the major portions of the cord 48 make a straight angle, which is a result of simply interchanging the ends of the cord from the state of FIGURE 4.

If the cord 48 coincided with a line tangent to the arbor, i.e., went on and came off the arbor at exactly the same point, pivot friction would be substantially nil, insofar as the tension in cord 48 is concerned. Actually, this tension creates a slight couple on the arbor in any case, since, as evident from FIGURES 6 and 8, the cord 48 comes off and goes on the arbor at points spaced along the length of the arbor.

A channel-like beam 55, which more or less nests (see FIGURE 6) in the channel-like bridge 40, is provided to transfer capsule motion to crank 51, and is pivoted by a second straight pin, whose head 56, and bent point 57, are visible in FIGURE 7. As indicated by the dashed line showing of the body of the said second straight pin, it runs through the downwardly projecting sides of bridge 40 and beam 55, suitable holes such as shown at 58 and 59 on beam 55 in FIGURE 8, being provided to journal the said pin in. Each of said holes has a counterpart in the other side of the view, making four in all, thus providing a choice of leverages. As is evident from the dashed line showing of pins, in FIGURE 4, the pair of holes including hole 59 is chosen, whereas in FIGURE 7, the pair of holes including 58 is chosen. The amplification due to lever 55 is therefore greater in the species of FIGURE 7 than in the species of FIGURE 4.

A tongue 60 at the end of beam 55 is overlapped by a second arm 61 of crank 51. As is evident from the figures, arms 50 and 61 of crank 51 are both parts of a curved piece having a rib 62 running along the convex side of said curved piece, said rib serving to stiffen said crank. A tab (visible at s, FIGURE 8) is struck down from the end of arm 61 and being rounded at its end, provides a one-point contact between the flat upper surface of tongue 60 and the extremity of arm 61. Ears 63 are also provided on the crank (only one ear 63 is shown, see FIGURE 8) which provide for journalling the crank on the first-mentioned straight pin.

The top diaphragm D of the capsule has a flat-topped nipple 64 extending from the center thereof, conveniently forming part of a rigid center pad secured to the diaphragm, and homologous with rigid center pad portion 15 of the diaphragm of FIGURE 1. The flat top of this nipple 64 is tangent to a rounded teat 64a struck out of the web of beam 55, and when it changes position, either forces beam 55 to deflect upward and cause crank 51 to unwrap some of cord 48 from arbor 44 against the reaction of spring 47, or allows the beam 55 to deflect down, in which case arm 61 follows tongue 60 in contact therewith, since through crank 51 spring 47 is urging arm 61 against tongue 60 at all times.

Obviously, arbor 44 rotates in one sense or the other, on its cylindrical axis, depending on whether capsule 30 is expanding or contracting to move nipple 64 upward or downward, respectively.

Figure 10:
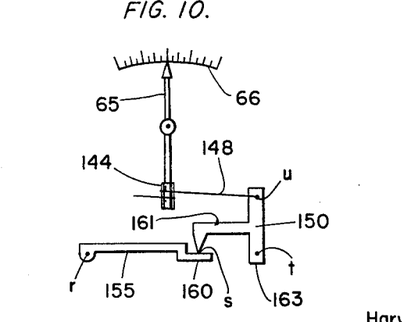
FIGURE 10 is a diagrammatic illustration of the principles of a movement in accordance with the invention.

One contribution the amplifying mechanism can make to obviating calibration of the movement Z is illustrated in FIGURE 10 in somewhat idealized fashion. As suggested by the reference numeral scheme, 155 represents the beam 55; 160, the tongue 60; 161, the arm 61 of crank 51; 150, the arm 50 of crank 51; 148, a portion of cord 48; 144, arbor 44; and 163, ear 63. Also, $r$ represents an end of the pivot axis of beam 55; $s$, the point of tangency of tongue 60 and arm 61; $t$, an end of the pivot axis of crank 51; and $u$, the point of fixation of cord 148 to arm 50 of crank 51. Finally, reference numeral 65 is to be supposed to denote a pointer fixed to arbor 144 and arranged to sweep around an arcuate scale 66 centered on the pivot axis of arbor 144. (Wings 33 (FIGURES 4 and 6) have tabs 67 for mounting a scale plate (not shown) with its plane parallel to plate 30, and having an arcuate, graduated line segment such as scale 66 thereon.)

If a right line segment be drawn through points $r$ and $t$ in FIGURE 10, it will be found to contain point $s$. If a normal to said segment be erected on point $t$, said normal will be found to contain point $u$. These points therefore define the lengths and orientations of the effective lever arms of beam 155, arm 161 and arm 150. In the state described, the linkage thus represented is said to be squared, and at the same time it will be noted that pointer 65 bisects scale 66. If this arrangement of parts is provided for in the manufacture of the motion amplifying mechanism, of the movement, capsule 30 need merely be inserted in the movement and bodily adjusted toward bridge 40 until pointer 65 coincides with that indicium on scale 66 which corresponds to the correct reading at that altitude. In the case of a barometer, the said indicium will be that of the true barometric pressure at the capsule, and in the case of an altimeter, the true altitude of the movement. (This altimeter setting can only be correct, however, as long as the actual barometric pressure at the time of setting does not change. This is an idiosyncrasy affecting all schemes for using barometric pressure as a measure of altitude.)

The illustrated motion amplifying mechanism is both economical of parts and labor, efficient and precise. The only machined parts are arbor 44 and screw 37, the remainder being stamped from a suitable material such as brass sheet, except cord 48, straight pins mounting crank 51 and beam 55 and spring leaf 34. The said "straight pins" are just those of household use that are called by that name. Spring leaf 34, of course, is made of brass, or other suitable spring material. Cord 48 is a silk or nylon thread, or the like. All parts of the movement are held in place without welding or soldering. A small blob of cement is placed on each of bent points 53 and 57, to assure that they do not move. Cord 48 passes through a slot 68 in the end of arm 50, and is cemented in place there. Only nipple 64, spring leaf 34 and the diaphragms D form an integral subassembly held together by welding and/or soldering.

Moreover, it will be observed that the movement is composed of exactly 14 separate parts: two diaphragms D, a center pad including nipple 64, screw 37, plate 31, spring leaf 34, bridge 40, arbor 44, cord 48, spring 47, beam 55, crank 51 and two straight pins. Movements W, X and Y require twice this number of parts and more.

FIGURE 6 makes it quite evident too that if the movement had to accommodate the typical external U-shaped capsule spring of the prior art, then the capsule would have to be much smaller than the one shown, in order to avoid increasing movement bulk. On the other hand, the movement would have to have upwards of twice the bulk shown in order to accommodate both the main spring and a large enough capsule to drive the movement as does the novel capsule of my invention.

As a barometer, the parts of the movement can be so proportioned that the capsule 30 drives the arbor 44 through nearly a 360° angular deflection for 2.4″ Hg change in barometric pressure. For altimeter use, say in the range of 0 to 6,000 ft., the diameter of arbor 44 is decreased enough that the movement as shown in FIGURES 4, 5 and 6, rotates the arbor 720° for the pressure change corresponding to 0 to 6,000 ft. For an even larger range, say 0 to 14,000 ft., the same movement is used except for a modification that amounts to fixing beam 55 rigidly to nipple 64 and omitting the pin corresponding to head 56. In practice, a rigid bar is fixed to nipple 64, said bar extending under and contacting the tab at $s$, as does tongue 60 in FIGURE 8.

In the foregoing, I have described my invention in such detail as to enable one skilled in the art to practice my invention to best advantage, insofar as that is to me known thus far. However, it is obvious that there are many variations in structure and application of the invention that may be carried out by one skilled in the art without exercise of invention. Hence, the invention, as described herein, is to be considered illustrative only of the claims appended hereto. It will be recognized that those skilled in the art have available to them a considerable store of practical knowledge which is routinely relied on in the manufacture and use of diaphragms and like deformable members. A recent compendium of this knowledge is contained in the monograph Diaphragm Characteristics and Terminology, by Floyd B. Newell, 1958, a publication of the American Society of Mechanical Engineers, and I hereby incorporate, by this reference thereto, the disclosure of said monograph in this application as part of the disclosure of my application.

I claim:

1. An annularly-corrugated, diaphragm of elastic material, said diaphragm in its free state having corrugations which, in radial cross-sections of the said diaphragm, are circularly arcuate, and whose peaks are tangent to a first circular arc and whose troughs are tangent to a second circular arc; the arcs of said corrugations being tangent to each other, and said peaks alternating with said troughs.

2. The diaphragm of claim 1, wherein each of said radial cross-section has the form of a segment of a sinuous line substantially like that sinuous line containing the segment S of FIGURE 1, hereunto annexed.

3. The diaphragm of claim 1, wherein each of said radial cross-sections has the form of a segment of a sinuous line substantially like that sinuous line containing the tracing SR of FIGURE 2, hereunto annexed.

4. The diaphragm of claim 1, wherein each of said radial cross-sections has the form of a segment of a sinuous line substantially like that sinuous line containing the tracing SM of FIGURE 3, hereunto annexed.

5. A pressure responsive device having wall structure exposed on one side thereof to a substantially vacuous space in said device, part of said wall structure being an annularly-corrugated diaphragm of elastic material rigidly joined around its periphery to the remaining said wall structure, said diaphragm in its free state having corrugations which, in radial cross-sections of said diaphragm, are circularly arcuate, and whose peaks are tangent to a first circular arc and whose troughs are tangent to a second circular arc; the arcs of said corrugations being tangent to each other, and said peaks alternating with said troughs.

6. The pressure responsive device of claim 5, wherein each of said radial cross-sections has the form of a segment of a sinuous line substantially like that sinuous line containing the segment S of FIGURE 1, hereunto annexed.

7. The pressure responsive device of claim 5, wherein each of said radial cross-sections has the form of a segment of a sinuous line substantially like that sinuous line containing the tracing SR of FIGURE 2, hereunto annexed.

8. The pressure responsive device of claim 5, wherein each of said radial cross-sections has substantially the form of a segment of a sinuous line substantially like that sinuous line containing the tracing SM of FIGURE 3.

9. An aneroid capsule having a flexible wall rigidly fixed around its periphery, said wall being in the form of a circular disk of elastic, substantially uniform-thickness material;

said capsule having an evacuated space therein next adjacent one side of said wall, whereby said wall is subject to a force thereon substantially equal to the product of its effective area and the absolute pressure external to said capsule;

said wall having annular concentric corrugations formed therein, and a circular rigid pad portion surrounded by said corrugations, said periphery and said circular rigid pad portion being concentric with said corrugations;

said wall having a circular planar, rigid, flange portion, said flange portion being concentric with said corrugations;

said wall, when exposed on its other side to a pressure substantially equal to that of said evacuated space, having a concavo-convex form wherein the corrugated portion of said diaphragm in radial cross-section is in the form of a series of arcs of tangent circles, wherein said arcs are joined end-to-end with alternating sense of curvature, each of said arcs of one sense of curvature being tangent to a first circular arc, and each of said arcs of the other sense of curvature being tangent to a second circular arc, said first circular arc and said second circular arc being in addition to the other said arcs; whereby said first circular arc and said second circular arc form an envelope of said series of arcs;

the proportions of said diaphragm and the elastic properties of said material being selected such that when said absolute pressure is a given positive value greater than the value of the pressure in said evacuated space, said diaphragm will flatten out its concavo-convex form to a flat form substantially enveloped between a pair of parallel straight lines.

10. The aneroid capsule of claim 9, wherein said first circular arc and said second circular arc have a common center.

11. The aneroid capsule of claim 9, wherein said first circular arc and said second circular arc are centered to one side of the axis of concentricity of said corrugations.

12. The aneroid capsule of claim 9, wherein said first circular arc and said second circular arc have a common center, and said center falls on a line that is parallel to the axis of concentricity of said corrugations and is spaced therefrom by the radius of said pad portion, said radius being taken normal to said axis and said pad portion terminating peripherally at said line.

References Cited by the Examiner
UNITED STATES PATENTS

| | | | |
|---|---|---|---|
| 2,185,971 | 1/1940 | Achtel et al. | 73—410 |
| 2,309,401 | 1/1943 | Kollsman | 73—410 |
| 2,760,260 | 8/1956 | Melchior. | |
| 2,942,624 | 6/1960 | Good | 92—104 |
| 3,034,535 | 5/1962 | McGay et al. | 92—95 |
| 3,043,339 | 7/1962 | Langstroth | 92—95 |
| 3,079,953 | 3/1963 | Mounteer | 92—104 |

SAMUEL LEVINE, *Primary Examiner.*

RICHARD C. QUEISSER, *Examiner.*